United States Patent
Schwarz

[15] 3,642,321
[45] Feb. 15, 1972

[54] HEAD AND NECK REST

[72] Inventor: Bernhard Schwarz, 11 Eichenstrasse, Muri, Bern, Switzerland

[22] Filed: Jan. 27, 1970

[21] Appl. No.: 6,176

[30] Foreign Application Priority Data

Jan. 28, 1969  Switzerland ..........................1153/69

[52] U.S. Cl. ...........................................297/410, 248/414
[51] Int. Cl. ...................................................A47c 7/38
[58] Field of Search ...............297/391, 410, 397; 248/414, 248/161, 411, 412; 287/58 CT

[56] References Cited

UNITED STATES PATENTS

| | | | |
|---|---|---|---|
| 216,282 | 6/1879 | McHenry | 248/414 |
| 480,822 | 8/1892 | Mayes | 297/410 X |
| 1,232,564 | 7/1917 | Karges | 248/414 |
| 1,924,858 | 8/1933 | Hopp | 248/414 |
| 2,632,497 | 3/1953 | Brady | 297/409 X |
| 3,262,666 | 7/1966 | Solum | 248/414 X |
| 3,265,346 | 8/1966 | Petrick | 248/414 |
| 3,292,974 | 12/1966 | Gelbman | 297/410 |
| 3,453,011 | 7/1969 | Meinunger | 287/58 CT |
| 3,467,352 | 9/1969 | Bohler | 248/412 |
| 3,511,535 | 5/1970 | Gunlock | 297/410 |

*Primary Examiner*—Francis K. Zugel
*Attorney*—Littlepage, Quaintance, Wray & Aisenberg

[57] ABSTRACT

A head and neck rest for automobile or airplane seats comprises a headpiece and means for mounting the headpiece above the backrest of a seat. The mounting means include a sleeve member which is fixed within the backrest and an upright rod longitudinally traversing the sleeve. The sleeve and the headpiece are longitudinally adjustable on the rod for varying the position of height of the headpiece above the backrest. Spring means preferably consisting of rubber blocks are engaged between the internal surface of the sleeve and the rod to exert pressure on the sleeve in a direction from the front towards the back of the headpiece for frictionally arresting the headpiece in its adjusted position on the rod. Friction-increasing inserts may be arranged between the rod and the internal surface of the sleeve.

6 Claims, 3 Drawing Figures

PATENTED FEB 15 1972  3,642,321
Fig. 1
Fig. 2
Fig. 3
HEAD REST SURFACE
SEAT
FRONT  REAR
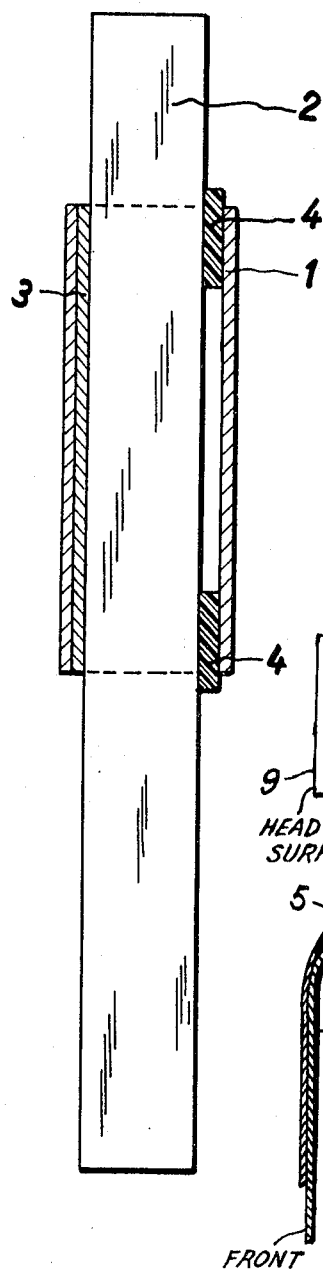
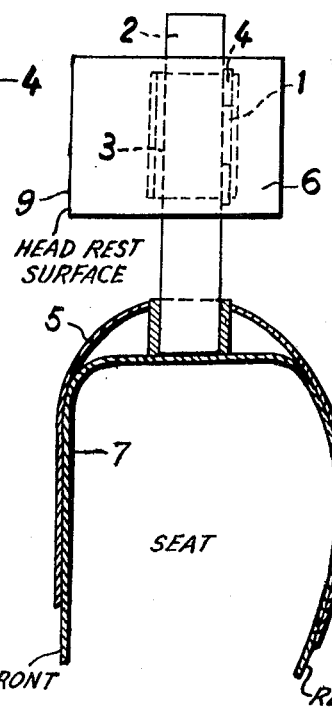
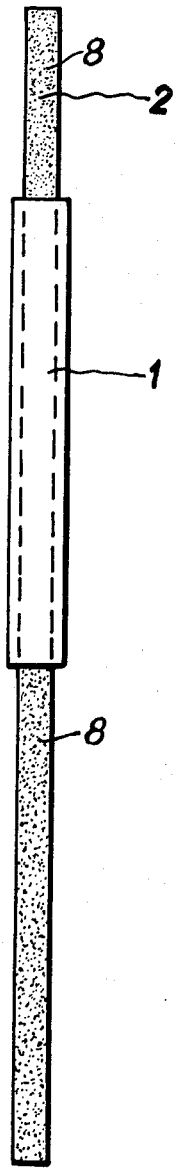
INVENTOR.
Bernhard Schwarz
BY
Littlepage, Quaintance, Murphy & Greenberg

HEAD AND NECK REST

This invention relates to head and neck rests, particularly for automobile and airplane seats.

Known headrests of adjustable height with respect to backrest of an automobile seat essentially consist of three parts, i.e., of the headrest support which is built into the backrest of the seat or placed over the top of the backrest, the headpiece and a connection between the headpiece and its support.

Such known head and neck rests have the following inconveniences:

For arresting the headpiece at the desired height screws of levers are provided, which are contradictory to the requirements of comfortable use. Mostly, such screws and levers form projecting rigid parts which can lead to injuries in the case of accidents. Also, the use of screws and levers increases the cost of manufacture, since they require threaded parts and bearings.

The object of the invention is the provision of an improved head and neck rest comprising simple and easily operable means for a stepless vertical adjustment of the headpiece of the rest. A further object is the provision of a head and neck rest which provides safety in use on a vehicle seat and which can be manufactured at moderate cost.

According to the invention, the head and neck rest comprises a headpiece, holding means for mounting said headpiece on the backrest of a seat, said holding means including an upright guide rod, a sleeve member fixed to said headpiece and slidably engaged on said guide rod, and spring means acting on said sleeve member to apply a portion of the internal surface of the sleeve member against said rod in a direction from the front towards the back of the head and neck rest.

The invention will now be described with reference to the accompanying drawings, in which FIG. 1 is a view in elevation and partly in longitudinal section of a component of a head and neck rest.

FIG. 2 is a front elevation of the component shown in FIG. 1.

FIG. 3 is a view in elevation and partly in section of a headrest according to the invention.

Referring to the drawings, a sleeve 1 is fixed within the headpiece 6 of a headrest. The sleeve 1 is traversed by a rod 2 which forms a connecting member between the headpiece 6 and the headrest mounting 5 which, in this example, is represented as a saddle to be slipped over the top of a backrest of an automobile seat 7. The rod 2 and the sleeve 1 are of rectangular cross section. A friction-increasing insert plate 3 is engaged between the side of the rod 2 facing the front of the headpiece 6 and the adjacent internal face of the sleeve 1. The insert plate 3 either is secured to the rod 2 or to the sleeve 1. The insert plate 3 may consist of rubber or of a suitable plastics material. Two resilient rubber bodies 4 are engaged between the side of the rod 2 facing the rear side of the headpiece 6 and the adjacent internal face of the sleeve 1. The two rubber bodies 4 exert a force on the sleeve 1, which is directed towards the rear side of the head piece 6 (towards the right side in FIG. 1). Thus, the internal front face of the sleeve 1 is applied against the rod 2. The static friction thereby provided between the contacting faces of the rod 2 and the insert plate 3, when the insert plate is fixed to the sleeve 1, or between the lateral faces of the sleeve 1 and the insert plate 3, when the insert plate is fixed to the rod 2, is of such magnitude that the sleeve 1 and accordingly the head piece 6, owing to this friction is arrested on the rod 2 in the adjusted position of height. The arrangement of the insert plate 3 between adjacent faces of the sleeve 1 and the rod 2 is not indispensible. The opposite faces of sleeve and rod themselves can be surface treated to provide increased friction, for example one or both contacting surfaces can be roughened by sandblasting 8, as shown in FIG. 2.

Upon a collision of two cars going in the same direction, the car which is hit in the back is suddenly accelerated. The head of a passenger in a seat provided with the described headrest is thrown backwardly against the forward face 9 headpiece 6, and the internal surface of the sleeve 1 in FIG. 1 is applied against the rod 2, thereby increasing the arresting force holding the headpiece 6 on the rod 2 proportionally with the increasing pressure. By the described dynamic process the safety provided by the head and neck rest is appreciably increased, since besides the absence of any screws and levers, the energy generated by the accident is utilized for increasing the arresting force holding the head piece in position on the rod.

Obviously, instead of the represented rubber bodies 4, also leaf springs, spiral or helical springs and the like, or a combination of different springs may be used. In case the sleeve would be longitudinally split in two parts, even tension springs may be used to provide the necessary frictional contact. Such springs may be connected between the two sleeve portions to pull them towards each other to press the surfaces of the sleeve portions against those of the rod. Besides being dependent on the above-described dynamic reaction occurring during a collision, the arresting force, i.e., the force of resistance against a longitudinal displacement of the sleeve 1 on the rod 2 is also dependent on the surface area of the adhering surfaces of the rod 2 and sleeve 1, on the coefficient of static friction and the pressure exerted by the rubber bodies 4. Theoretically, this arresting force can be given any desired value. Practically, however, the coating friction surfaces, for adjusting the position of the headpiece 6 on the rod 2, are required to be disengageable by hand without the use of tools or without requiring an excessive effort.

For relieving the arresting action of the described headrest, it suffices to exert a tilting force by hand from above or from below on the headpiece 6. Since the headpiece projects laterally of the rod 2, the point of application of the tilting force is situated outside of the longitudinal axis of the rod, so that a torque is produced acting on the sleeve 1 which is firmly secured to the head piece 6. Thereby one of the rubber bodies 4 is compressed and the sleeve 1 is tilted relative to the rod 2. Due to this tilting movement, the front side inner surface of the sleeve is lifted off the corresponding surface of the rod 2 for such an amount that the friction between the two surfaces is sufficiently reduced in order to be able to continuously move the sleeve 1 and accordingly the headpiece 6 along the rod 2. This tilting movement, as already mentioned is effected by a slight tilting movement of the headpiece 6 relatively to the longitudinal axis of the rod in upward or downward direction.

The resilient members 4 must exert such a force that a shifting of the sleeve 1 along the rod 2 is not possible or very difficult to obtain without effecting the described tilting movement. An ordinary friction system for the vertical adjustment of the headpiece 6, such as it may be used for example in lampstands would not provide a sufficient arresting force.

When rubber is selected for the resilient friction blocks 4, it is necessary to coat the side of the block contacting the rod 2 with a material having high antifriction properties, for example Teflon since rubber normally is extremely adherent and would impair an easy adjustment of the headpiece along the rod 2. It is also possible to use special types of rubber having improved sliding properties.

It results from the drawing of the represented example of the head and neck rest that it offers the further advantage of being simple and cheap to manufacture. Preferably, standard section rods and section tubes of metal, which are commercially available are used for the sleeve 1 and rod 2. The sleeve may also be made from other suitable materials having a higher friction coefficient than that of metal sliding on metal, whereby it becomes possible to avoid the use of an insert member 3.

I claim:

1. A head and neck rest, particularly for automobile and airplane seats, comprising a headpiece, holding means for mounting said headpiece on the backrest of a seat, said holding means including an upright guide rod having forward and rear facing surfaces rigidly connected to a seat, a tiltable vertically elongated sleeve member having upper and lower ends fixed to said headpiece and slidably engaged on said guide rod, compressible, resilient spring means mounted within upper and lower ends of the sleeve member at a rear portion thereof, and acting on said sleeve member to apply a rearward facing internal surface portion of the sleeve member against said rod in a direction from a front towards a back of the seat, and a friction-increasing member on the means cooperating between a rearward facing internal surface portion of said sleeve member and a forward surface of the rod for preventing mutual sliding when said rearward facing surface portion and forward surface are held in contact, the friction member being more rigid than the spring means, whereby compressing the spring means at one end of the sleeve tilts the friction member away from the rod, reducing frictional force, and permitting sliding of the sleeve along the rod.

2. A head and neck rest according to claim 1, in which said spring means are upper and lower springs engaged between a forward facing portion of the internal surface of said sleeve member and a rearward surface of the guide rod to press the rearward facing portion of the internal surface of the sleeve member against the forward face of said rod.

3. A head and neck rest according to claim 2, in which said spring means are formed by rubber blocks fixed on the sleeve member and engaged between the sleeve member and the guide rod.

4. A head and neck rest according to claim 3, in which the rubber blocks are provided with a friction-reducing coating at least on their surface.

5. The head and neck rest of claim 1 wherein said rod comprises a rough forward facing surface on said rod.

6. The head and neck rest of claim 1 wherein the spring means comprises upper and lower compressible springs whereby a single spring may be compressed for tilting the sleeve and moving the rearward facing internal surface portion away from the rod.

* * * * *